United States Patent [19]

Takehara et al.

[11] Patent Number: 5,257,191
[45] Date of Patent: Oct. 26, 1993

[54] STEERING DEVICE FOR REAR VEHICLE WHEELS

[75] Inventors: Shin Takehara, Higashi; Ryuya Akita, Hiroshima; Hiroshi Ohmura, Hatsukaichi, all of Japan

[73] Assignee: Mazda Motor Corporation, Hiroshima, Japan

[21] Appl. No.: 765,529

[22] Filed: Sep. 25, 1991

[30] Foreign Application Priority Data

Sep. 25, 1990 [JP] Japan .................. 2-258488
Sep. 25, 1990 [JP] Japan .................. 2-258489

[51] Int. Cl.$^5$ .............................................. B62D 7/15
[52] U.S. Cl. ............................ 364/424.05; 180/79.1; 180/182
[58] Field of Search .............. 364/424.05, 424.03; 280/91; 180/79.1, 140–143

[56] References Cited

U.S. PATENT DOCUMENTS

| 4,856,606 | 8/1989 | Brown | 280/91 |
| 4,881,611 | 11/1989 | Nakashima et al. | 180/79.1 |
| 4,934,473 | 6/1990 | Fushimi et al. | 180/79.1 |
| 4,943,758 | 7/1990 | Tsurumiya | 180/142 |
| 4,953,648 | 9/1990 | Ohmura | 280/91 |
| 4,984,647 | 1/1991 | Morishita et al. | 364/424.05 |
| 5,014,801 | 5/1991 | Hirose | 364/424.05 |
| 5,068,584 | 11/1991 | Herent et al. | 180/79.1 |

FOREIGN PATENT DOCUMENTS

| 371851 | 5/1990 | European Pat. Off. . |
| 57-44568 | 3/1982 | Japan . |
| 61-46763 | 3/1986 | Japan . |
| 2083422 | 3/1982 | United Kingdom . |

OTHER PUBLICATIONS

Patent Abstracts of Japan, vol. 13, No. 473 (M884), Oct. 26, 1989.
Patent Abstracts of Japan, vol. 15, No. 381 (M1162), Jul. 1, 1991.

Primary Examiner—Gary Chin
Attorney, Agent, or Firm—Keck, Mahin & Cate

[57] ABSTRACT

A device for steering the rear wheels of a vehicle has a first motor controlled at least with respect to the steering angle of the steering wheel, a gear change mechanism for changing gear ratios, a second motor for controlling the gear ratio by driving the gear change mechanism, a steering mechanism for steering the rear wheels by transmitting a portion of the force equal to the product of the amount that the first motor is driven and the amount that the second motor is driven, a motor failure determination device for detecting motor failure when the amount that either of the first or second motors is driven is zero and the other of the motors is operated, and a control device for controlling both motors so that when motor failure is detected in one of the motors, the amount that the other motor is driven is brought to zero. The steering device may further have a sensor for detecting the steering angle of the rear wheels, and a sensor failure detecting device which monitors the steering angle detected by the sensor, and detects a failure of the sensor when the steering angle of the rear wheel changes although the amount that one of the motors is driven is zero. Also disclosed is a process for steering the rear wheels of a vehicle.

9 Claims, 8 Drawing Sheets

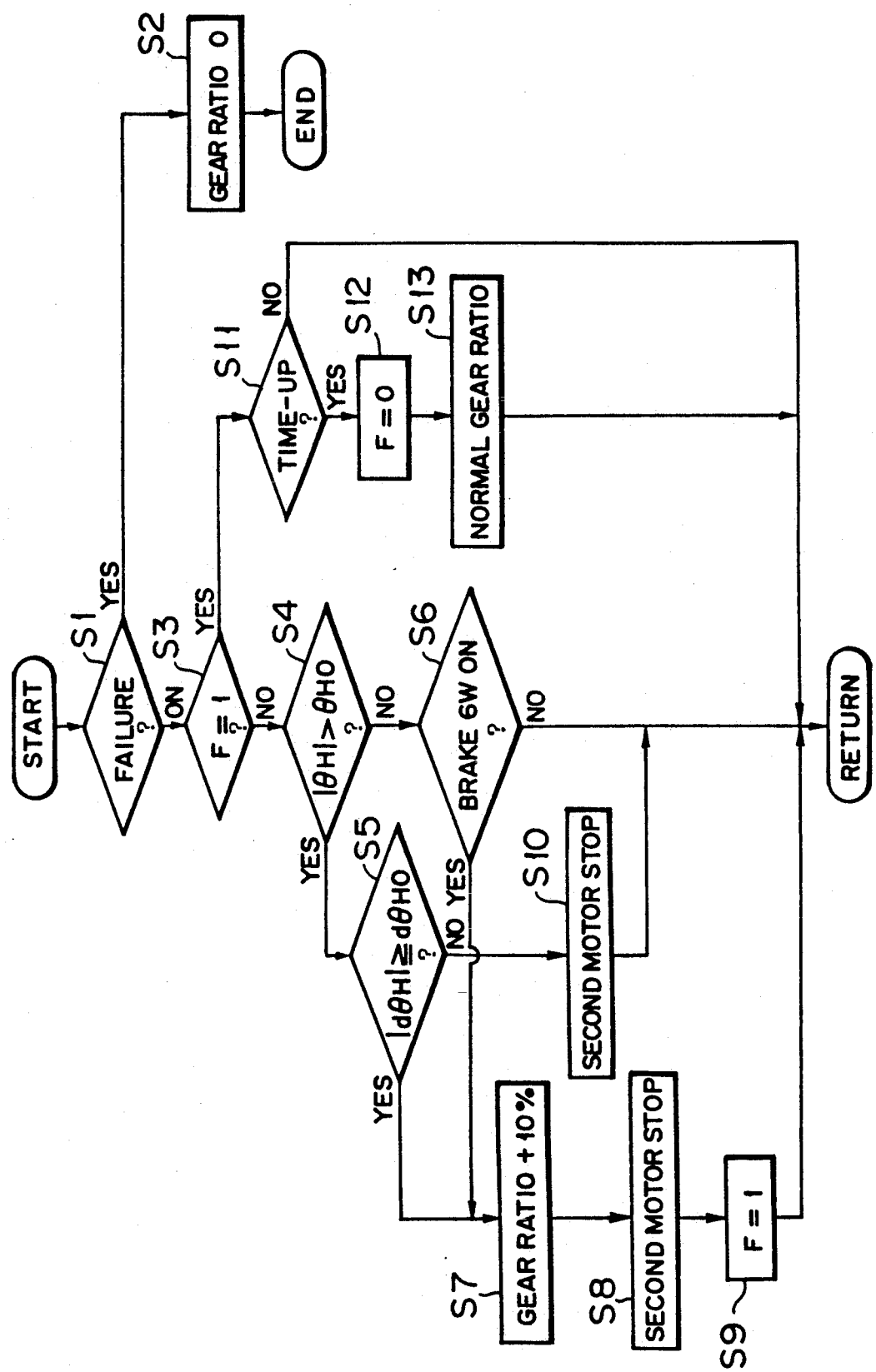

STEERING DEVICE FOR REAR VEHICLE WHEELS

FIELD OF THE INVENTION

The present invention relates to a steering device for the rear wheels of a vehicle and, particularly, to a device which steers the rear wheels with the drive force of a motor. The invention also relates to a method of steering the rear wheels.

BACKGROUND OF THE INVENTION

Steering devices for the rear wheels of vehicles are known in which both a steering mechanism, in which the driving force of an electric motor is transmitted to the rear wheels of a vehicle in order to steer the rear wheels, and a controller, for controlling the operation of the electric motor in response to either the steering angle of the steering wheel or the wheels' speed, are provided. Such devices are disclosed, for example, in Japanese Unexamined Patent Application (hereinafter Kokai) No. Sho 57-44568, and Kokai No. Sho 61-46763. This type of rear wheel steering device, when compared to the type of device which steers the rear wheels by transmitting the steering power of the front wheels to the rear wheels by means of a rod, etc., has the advantages that even when the steering angle of the front wheels is zero, the rear wheels can be steered and the ease of control of the steering of the rear wheels is great.

To counteract motor failure in this type of prior art steering device for rear wheels, a clutch for interrupting the power from the electric motor to the rear wheels, and a centering spring which holds the rear wheels in a centered position are provided in the steering mechanism.

However, because the preset spring load of the centering spring is set at a fairly high value, there is the fear of instability because, when the motor fails during rotational operation, the rear wheels are suddenly returned to the centered position. Also there is the problem that, to counteract the high spring load, the electric motor is made large and with a large output. Also, the rear wheel steering is lacking in quickness.

In order to solve the above problems, it was thought to provide two electric motors in series so that when one motor fails, the other is used as a reserve. However, in this type of arrangement, because it is necessary to provide a clutch to cut off the power transmission line from the electric motor, the device must be made with large dimensions. Also, because the reserve drive motor is only rarely used, maintenance of its operation is also a problem.

SUMMARY OF THE INVENTION

The present invention takes into consideration the above problems presented by the prior art.

Therefore, it is an object of the present invention to provide a steering device which appropriately uses two motors in combination and is designed to be small in size and to quickly steer the rear vehicle wheels. It is also an object of the present invention to detect failure of the electric motor within a short period after steering of the rear wheels has begun, and to reliably avoid putting a load on the motor or the engine. It is also an object of the present invention to safely maintain the vehicle in the two wheel steering condition and set the rear wheel steering angle at zero when there is a failure.

In order to achieve the above objects, the present invention provides a device for steering the rear wheels of a vehicle having a first motor controlled at least with respect to the steering angle of the steering wheel, a gear change mechanism for changing gear ratios, a second motor for controlling the gear ratio by driving the gear change mechanism, a steering mechanism for steering the rear wheels by transmitting a portion of the force equal to the product of the amount that the first motor is driven and the amount that the second motor is driven, a motor failure determination means for detecting motor failure when the amount that either of the first or second motors is driven is zero and the other of the motors is operated, and control means for controlling both motors so that when motor failure is detected in one of the motors, the amount that the other motor is driven is brought to zero.

In another embodiment of the present invention, the device further has a sensor for detecting the steering angle of the rear wheels, and sensor failure detecting means which monitors the steering angle detected by the sensor and detects a failure of the sensor when the steering angle of the rear wheel changes although the amount that one of the motors is driven is zero and the other of the motors is operated.

Yet another embodiment of the invention resides in a process for steering the rear wheels of a vehicle.

Further objects, features and embodiments of the present invention will become apparent from the Detailed Description of the Preferred Embodiments which follows, when considered together with the attached figures.

BRIEF DESCRIPTION OF THE DRAWINGS

In the drawings:

FIG. 12 is a flow chart representing a program used for changing a gear ratio for the rear wheels according to another embodiment.

DETAILED DESCRIPTION OF THE PREFERRED EMBODIMENTS

Figure 1:
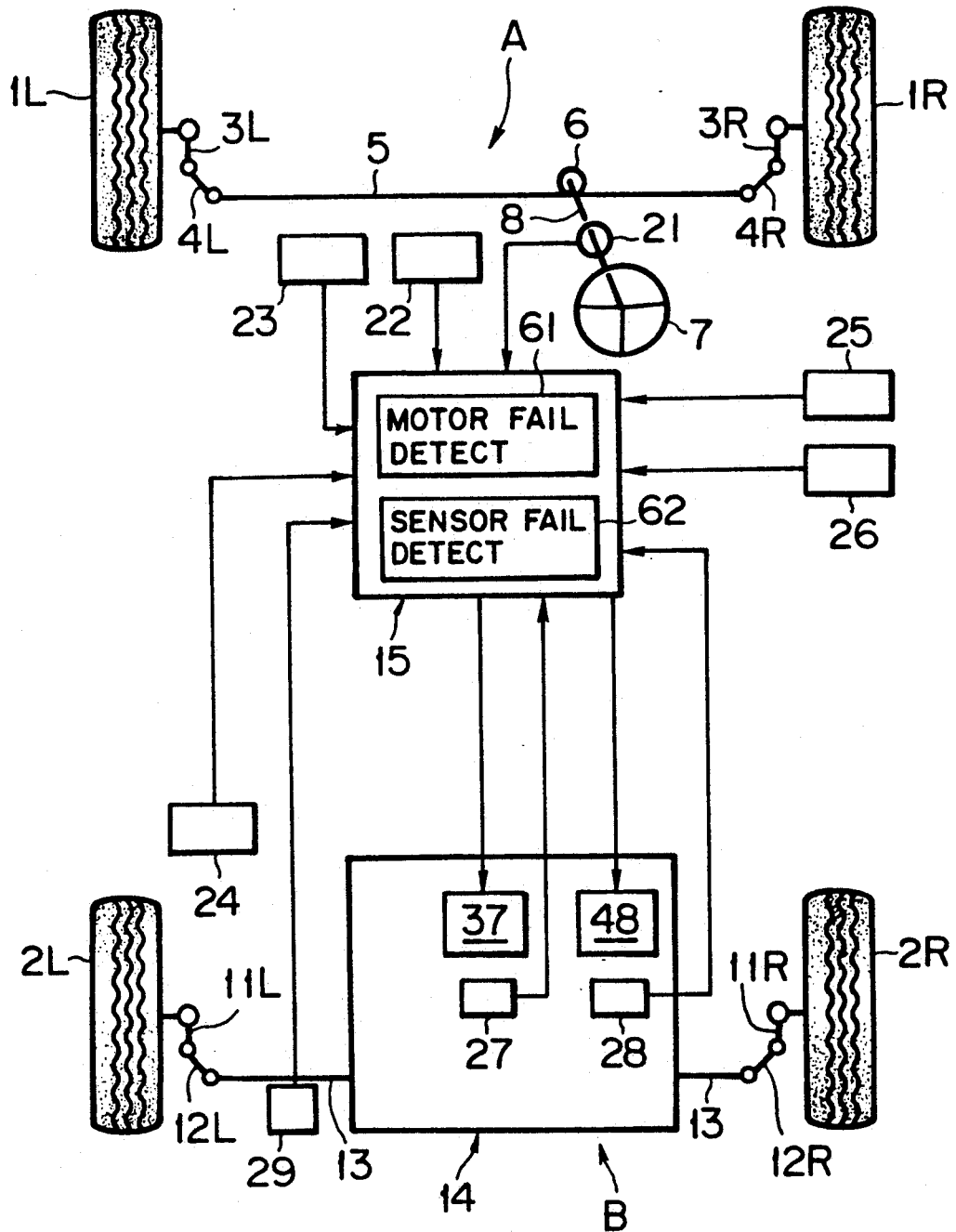
FIG. 1 shows a schematic drawing of a vehicle steering system incorporating the present invention.

The preferred embodiments of the present invention will now be explained with reference to the attached drawings in which like reference numerals indicate like parts.

In the preferred embodiment, the failure determination means detects a failure in the motors with respect to whether one of the two motors is being operated, or whether it operates properly when the amount that the other of the two motors is driven is zero. In this case, because the product of the amount the first motor is driven and the amount the second motor is driven is zero and, therefore, steering power is not being transmitted to the rear wheels, there is no load from the rear wheel steering device on the motors or the engine.

When the amount one motor is driven is zero and the other motor is operated, the rear wheel steering angle is zero and does not change. In the second embodiment, a disparity is detected in the sensor when the steering angle changes in the above case.

When both of the motors are functioning properly, the control means suitably controls each of the two motors, the steering force corresponding to the product of the driving force of the two motors is transmitted to the rear wheels by means of the steering mechanism, and the rear wheels are steered.

If either one of the above motors is detected to fail, the amount the other motor is driven is set to zero by means of the control means and, because the steering force which is the product of the amount the two motors are driven is also zero, the steering angle of the rear wheels becomes zero and the vehicle is steered by the two front wheels.

FIG. 1 illustrates the complete construction of a vehicle steering system provided with one embodiment of the rear wheel steering device of the present invention. This steering system is composed of a front wheel steering device A which steers the left and right front wheels 1L, 1R, and a rear wheel steering device B which steers the left and right rear wheels 2L, 2R.

The front wheel steering device comprises a pair of left and right knuckle arms 3L, 3R, connected to corresponding tie rods 4L, 4R, a relay rod 5 connected to the companion tie rods 4L, 4R, and a pinion 6 provided at one end of the steering shaft 8 which is meshed with a toothed rack (not shown) formed above the relay rod. At the other end of the steering shaft 8, a steering wheel 7 is provided. Relay rod 5 changes position in the direction of the wheels in response to the operation of the steering wheel 7, and the front wheels 1L, 1R are thus steered.

The rear wheel steering device comprises a pair of left and right knuckle arms 11L, 11R connected to corresponding tie rods 12L, 12R, and a relay rod 13 connected to the pair of tie rods 12L, 12R. A rear wheel steering control mechanism 14 makes the relay rod 13 move in the direction of the axle (that is, in the direction of the wheels) and thus steers left and right rear wheels 2L, 2R. Control unit 15 is provided to control the rear wheel steering mechanism 14 or, more particularly, to control the operation of the first and second motors 37, 48.

Reference numeral 21 designates a steering angle sensor for detecting the steering angle of the steering wheel. Numeral 22 designates a vehicle speed sensor for detecting vehicle speed. Numerals 23 and 24 designate lateral acceleration sensors for detecting the lateral acceleration at the front and rear portions of the vehicle body. Numeral 25 designates a brake switch. Numeral 26 designates an acceleration switch. The signals from sensors 21-24 and switches 25, 26 are entered into the control unit 15. The signals from the various sensors of the rear wheel steering control mechanism 14, that is, from encoder 27, gear ratio sensor 28, and rear wheel steering angle sensor 29, are also entered into the control unit 15.

The specific structure of the rear wheel steering control mechanism 14 is shown in FIGS. 3 through 7. In the figures, the left and right ends of the relay rod 13 are attached to tie rods 12L, 12R by means of ball joint 31. The sector gear 32 is generally attached to relay rod 13 and, by means of a spline connection, allows rotation and relative movement in the direction of the axle. Sector gear 32 meshes with gear portion 34a which is formed on the outer circumference of ball screw 34. Shaft 33 is connected so as to be driven by the first motor 37 by means of a group of bevel gears 35, 36. When motor 37 is rotated in reverse, ball screw 34 moves shaft 33 in the direction of the axle, and relay rod 13 begins to rotate about its axis by means of sector gear 32. The first motor 37 is fitted with an encoder 27 which feeds operation information from the motor 37 to the control unit 15.

The gear change mechanism 41 is provided with an arm member 42, which is formed integrally with the relay rod 13 and extends in the radial direction from the central axis of rod 13, and a ring member 43, which is positioned on the outer circumference of relay rod 13 and mates with arm member 42. The ring member 43 has two axle portions 43a, 43b which stretch in a direction intersecting the axis of relay rod 13. The ring member is supported in the housing 44 so as to be able to rotate with respect to the housing along the axis of the axle portions within a predetermined angle. Ball bush 45 is provided to move in frictional engagement with the inner circumferential surface of the ring member 43 and is connected to the front end of arm member 42.

Figure 2:
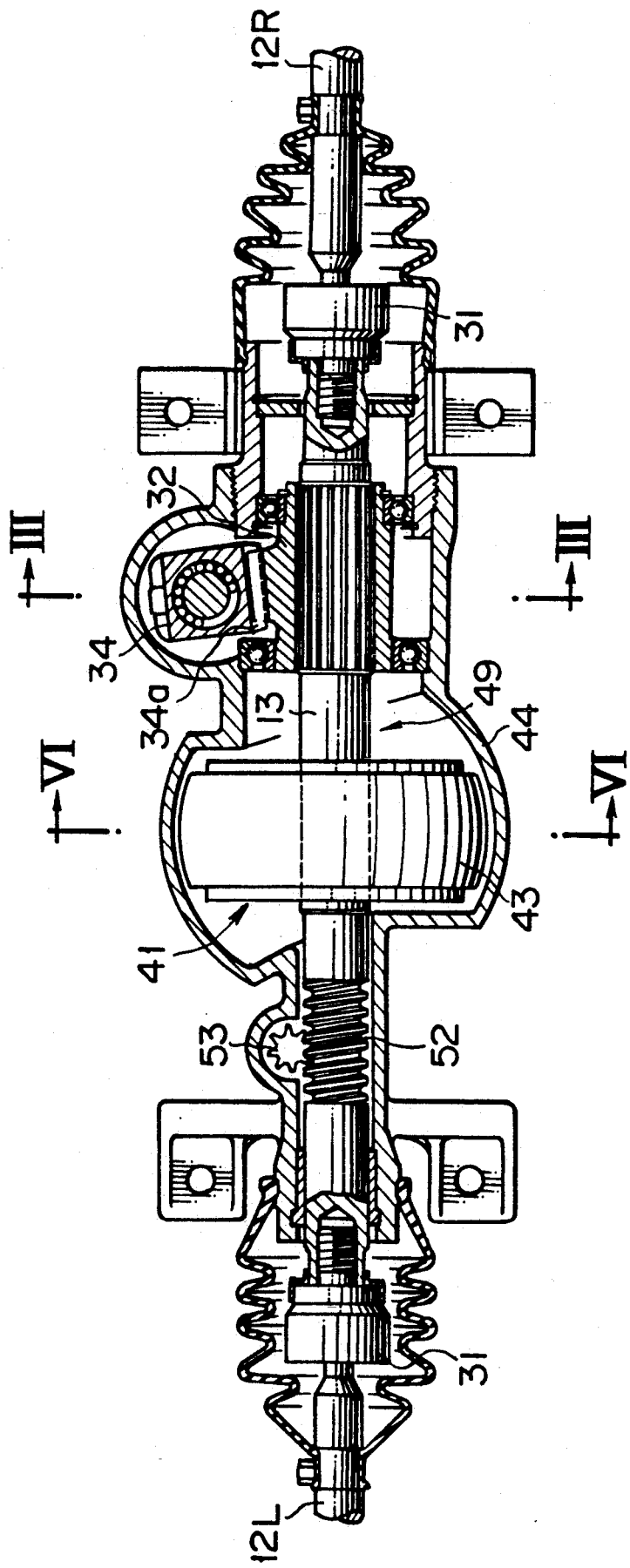
FIG. 2 shows a cross section of a rear wheel steering mechanism according to the present invention.
Figure 3:
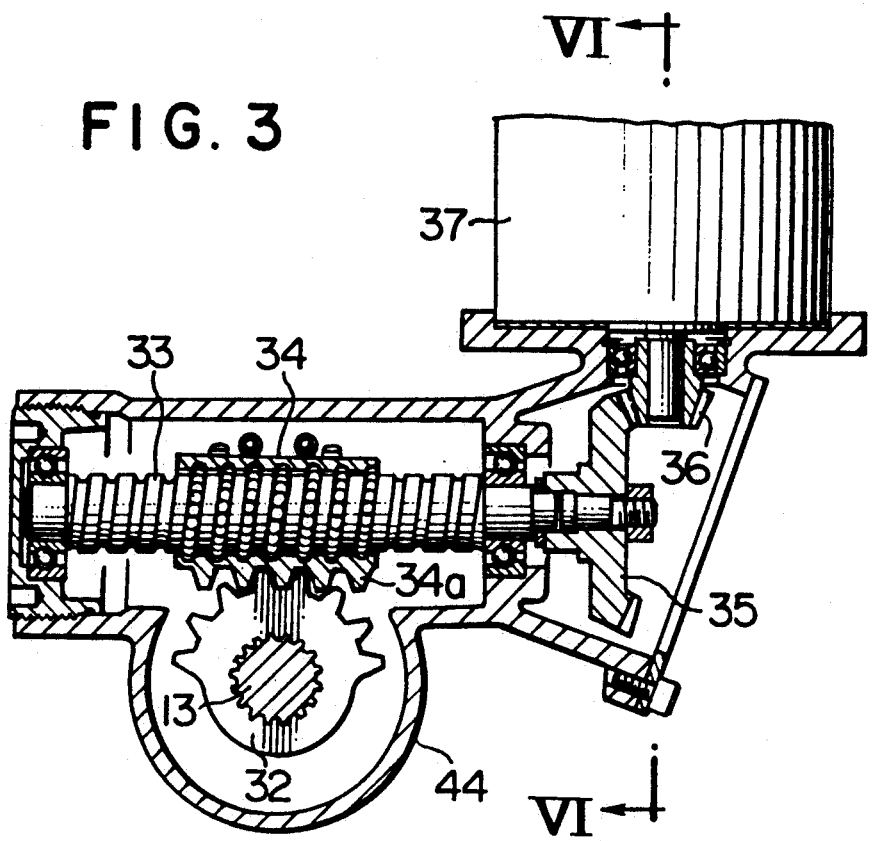
FIG. 3 is a cross section taken along the plane III—III in FIG. 2.
Figure 4:
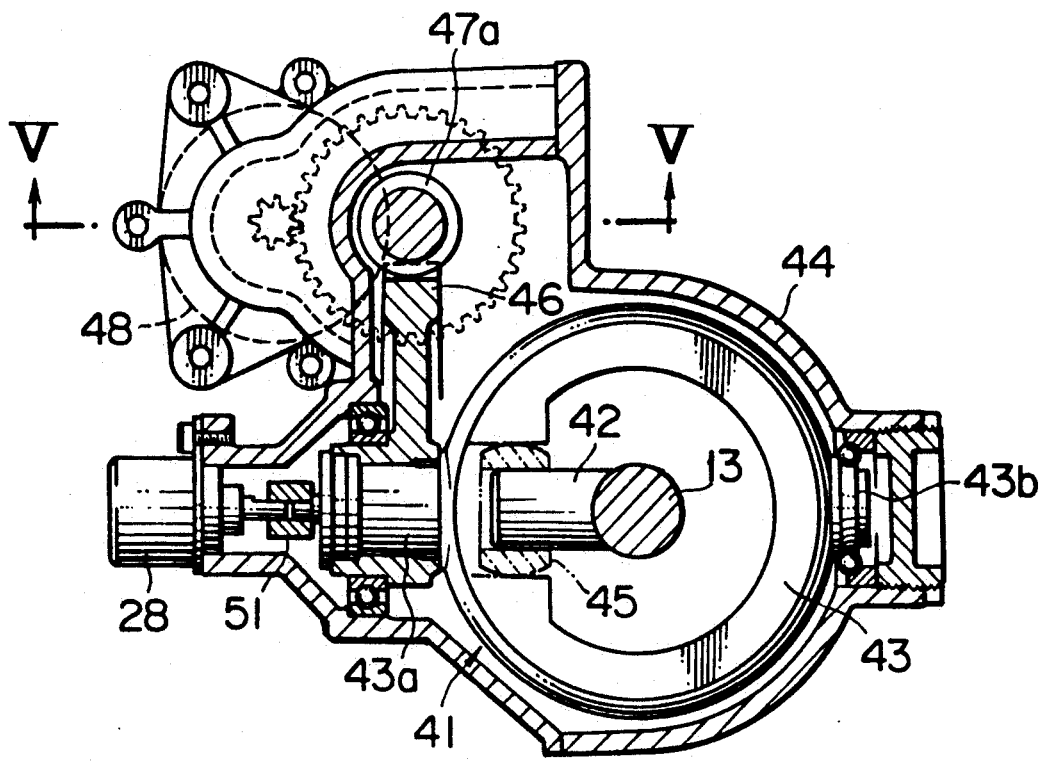
FIG. 4 is a cross section taken along the plane IV—IV in FIG. 2.
Figure 5:
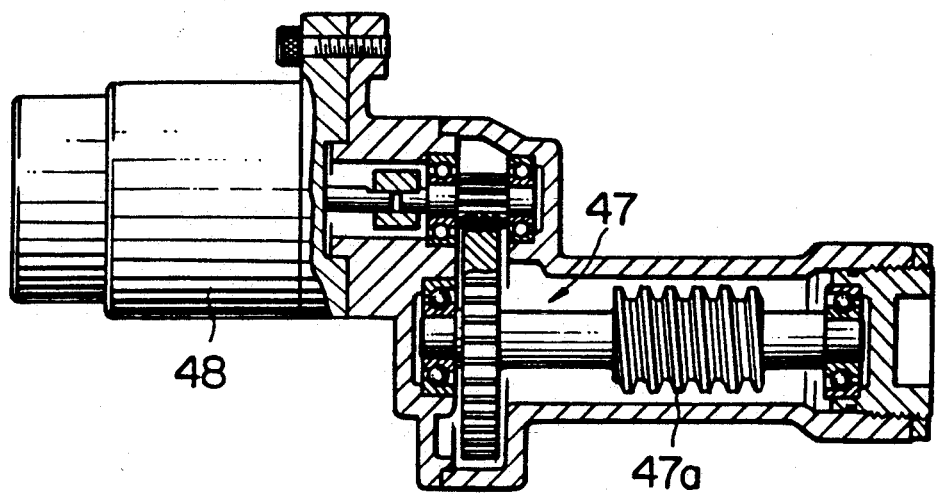
FIG. 5 is a cross section taken along the plane V—V in FIG. 4.

Sector gear 46 is fitted to rotate together with the axle portion 43a of the ring member 43. Sector gear 46 is meshed with gear 47a of the reduction gear device 47. Device 47 is connected with second motor 48. Ring member 43 is thus rotated around axle portions 43a, 43b by the force of second motor 48. The gear ratio is determined by the size of the angle of inclination (this angle is zero in FIG. 2) of the ring member 43 with respect to the axis of relay rod 13. When the ring member 43 is inclined at a predetermined angle, that is, when the gear ratio has a value other than zero, relay rod 13 is rotated by the operation of first motor 37, the ball bush 45 at the front end of arm member 42 moves and rubs along the inner circumferential surface of ring member 43, and relay rod 13 is thus made to move in the direction of the vehicle axle (in the direction of the wheels). This movement of the relay rod 13 in the direction of the axle is proportional to the sum of the gear ratio and the angle by which the relay rod rotates. The steering device 49, constructed in the above manner, thus steers the rear wheels by transmitting to the rear wheels a portion of the steering power which is the sum of the amount the first motor 37 is driven and the amount the second motor 48 is driven.

A gear ratio sensor 28 is attached to axle portion 43a by means of joint 51. In the gear ratio sensor 28, the gear ratio is detected based on the angle of inclination of the ring member 43, and the gear ratio data is outputted to the control unit 15. A gear portion 52 is formed on the outside circumferential surface of the relay rod 13. The pinion 53, which is connected to the rear wheel steering angle sensor 29, is meshed with the gear portion 52. The rear wheel steering angle is detected by the sensor 29, based on the amount that the relay rod 13 is moved in the direction of the axle, and the rear wheel steering angle data is outputted to the control unit 15.

The control of the operation of first motor 37 and second motor 48 by means of the control unit 15 will now be explained. First of all, following the flow chart of FIG. 7, failure of the motors 37, 48, encoder 27 and gear sensor 28 is determined.

In other words, after waiting for the system start in step S1, in step S2, the amount the motor 37 is driven is set to zero and, in step S3, it is ascertained whether the amount the first motor 37 is driven is zero or not based on the signal from the encoder 27. After waiting for the amount motor 37 is driven to become zero, in step S4, amount the that the second motor is driven (that is the gear ratio of the gear change mechanism 41) changes over 1 cycle from a maximum value to a minimum value and, in step S5, it is determined whether the second motor 48 has operated or not based on the signal from the gear ratio sensor 28.

If the determination of step S5 is YES, it is determined in step S6 whether the rear wheel steering angle $d\theta R$ is equal to the approximately zero value $d\theta R0$ ($=0$) or not. In the state where the amount the first motor 37 is driven is zero, because the product of the amount the first motor 37 is driven and the amount the second motor 48 is driven is usually zero, even if the second motor 48 is made to operate, no steering power is transmitted to the rear wheels and the rear wheel steering angle remains at zero without changing. When the rear wheel steering angle changes and the rear wheel steering angle speed has a value other than zero, there is a defect in the center position recognized in the encoder 27 which is due to the fact that the amount that the first motor 37 is being driven is in fact not zero. Accordingly, step S6 determines, ultimately, whether or not there is a failure because of a defect in the center position of the encoder 27.

When the determination of step S6 is YES (there is no defect in the center position of encoder 27, and hence no failure), the amount the second motor 48 is driven is made zero in step S7. In step S8 it is ascertained whether the driving force of the second motor 48 has become zero or not based on the signal from the gear ratio sensor 28. After waiting for the driving force of motor 48 to become zero, step S9 changes the amount the first motor is driven in one cycle from between a maximum value to a minimum value. In step S10, it is determined whether the first motor 37 has operated or not based on the signal from the encoder 27.

When the determination of step S10 is YES, it is determined in step S11 whether the rear wheel steering angle speed $d\theta R$ is equal to the approximately zero value $d\theta R0$ ($=0$) based on the signal from the rear wheel steering angle sensor 29. When the amount that the second motor 48 is driven is zero, because the product of the amount that the first motor 37 is driven and the amount that the second motor 48 is driven is usually zero, even if the first motor 37 is made to operate, absolutely no steering power is transferred to the back wheels and the steering angle of the rear wheels remains at zero. In this case, if the steering angle changes and the steering angle speed has a value other than zero, there is a defect in the center position of the gear ratio sensor 28 because the amount that the second motor 48 is driven is not actually zero. Accordingly, step S11 ultimately determines whether or not there is a failure due to a defect of the center position in the gear ratio sensor 28.

When the determination of step S11 is YES (there is no failure and no defect in the center position of the gear ratio sensor), the process returns.

On the other hand, when the determination of step S5 is NO (there is a failure because the second motor 48 is not operating), when the determination of step S6 is NO (there is a failure because of a defect in the center position of the encoder 27), when the determination of step S10 is NO (there is a failure because the first motor 37 is not operating), and when the determination of step S11 is NO (there is a failure because of a defect in the centering position of gear ratio sensor 28), the amount that the first motor 37 is driven and the amount that the second motor is driven are both made zero in step S12 and, in step S13, the failsafe determination is stopped and the control is ended.

The motor failure determination means 61, to determine a motor failure because one of the two motors 37, 48 is zero while the other is operated, is constructed according to the above-described flow chart, particularly by steps S2–S5 and S7–S10. By means of steps S6 and S11, the rear wheel steering angle detected by the rear wheel steering angle sensor 29 is monitored and forms the sensor failure detection means 62. The means 62 detects failures when the amount that one of the first and second motors 37, 48 is driven is zero and yet when the other motor is made to operate the steering angle changes. Such failures are due to failures in the encoder 27 which detects the operation of the motor which is set to zero, and failures of the gear ratio sensor 28. Both of the above-described failure determination means 61, 62 are provided in the control unit 15.

According to the system of the above-described flow chart, failure of motors 37 or 48 can be quickly and certainly determined. In order to detect failure of the first and second motors 37, 48, when the amount that one of the two motors is driven is set to zero, the product of the amount that the motors 37, 48 are driven is zero, and because there is no transmission of steering power from the steering mechanism 49 to the rear wheels, no load is put on the motors or the engine. When failure of the motors 37, 48 is detected, because the sensors of the rear wheel steering mechanism portion 14, the encoder 27 and the gear ratio sensor 28, can easily fail at the same time, control of the rear wheel steering is extremely effective according to the present invention.

As a result of the determination of a failure, when any of the motor 37, motor 48, sensor 27 and sensor 28 have not failed, the operation of the first motor 37 and second motor 48 is controlled by the control unit variously as follows.

The operational control of the first motor 37 takes place so that the rotational angle $\theta 1$ of the relay rod 13 is changed by the operation of the motor 37 based on the following mathematical formula (1).

$$\theta 1 = -K1\ \theta H + K2\ V\Phi \qquad (1)$$

Figure 8:
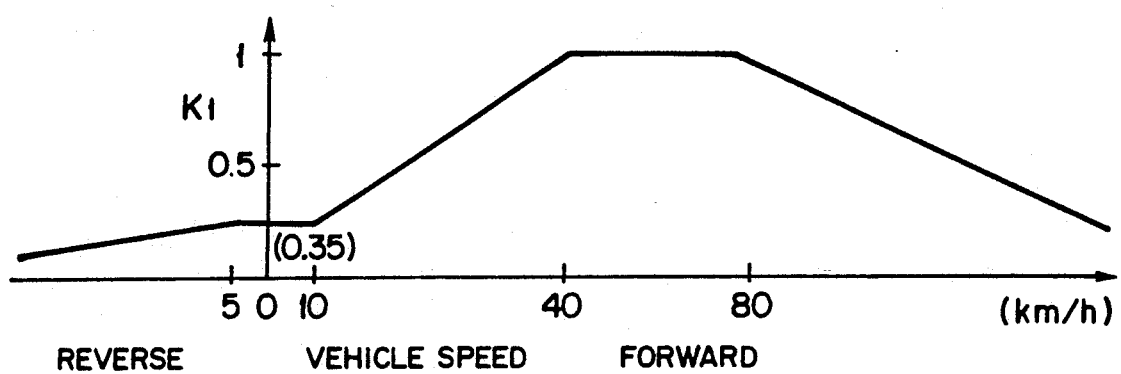
FIGS. 8 and 9 show the variation of coefficients K1 and K2 in formula (1) versus vehicle speed.
Figure 9:
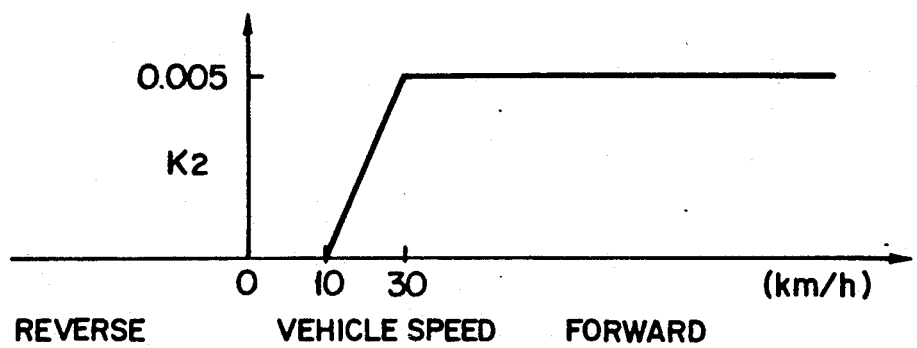

In the formula, $\theta H$ is the steering angle of the steering wheel, V is the vehicle speed, and $\Phi$ is the yaw rate. Coefficients K1, K2 are variables which change according to vehicle speed, and are determined according to the characteristics of the vehicle. To give one specific example, K1 is, as shown in FIG. 8, for all practical purposes about 0.35 until the vicinity of about 10 km/h. As the vehicle speed exceeds 10 km/h, K1 gradually increases along with the speed until it becomes about 1 in the vicinity of 40 km/h. As the speed exceeds 80 km/h, at high speeds, in order to maintain straight line stability, K1 is made to decrease along with the increase in vehicle speed and reactions with respect to the front wheel steering angle become slower. When running in reverse, at speeds of less than 5 km/h where tight turns are demanded, K1 is about 0.35. At reverse speeds exceeding 5 km/h, in order to maintain stability, K1 decreases together with an increase in vehicle speed. On the other hand, K2, as shown in FIG. 9, gradually increases at greater than 10 km/h, and in the neighborhood of 30 km/h it increases to about 0.005.

Figure 10:
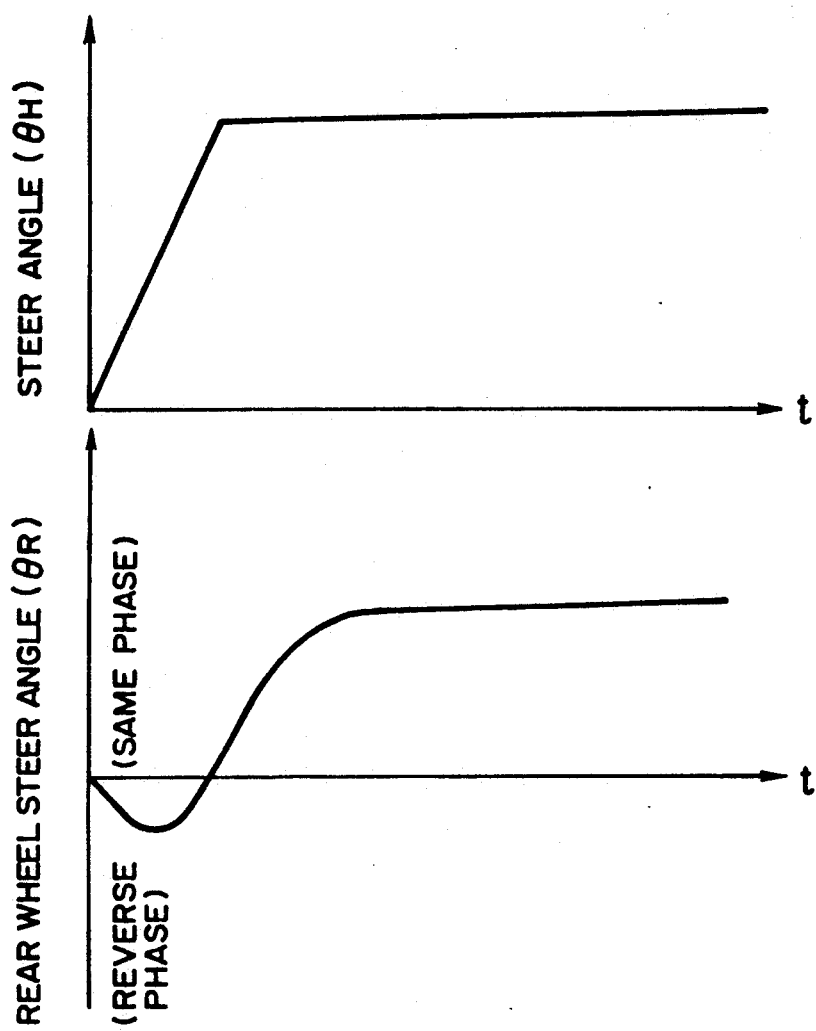
FIG. 10 shows the steering wheel steering angle and rear wheel steering angle characteristics according to the present invention.

FIG. 10 shows an example of the characteristics of the steering wheel steering angle θH and rear wheel steering angle θ when the gear ratio is fixed and the rotational angle θ1 of the relay rod 13 is controlled according to the above mathematical formula (1). As can be understood from the Figure, because the rear wheel steering angle θR is a function of the yaw rate Φ or vehicle speed V in addition to steering wheel steering angle θ, it does not necessarily have a proportional relationship to the steering wheel steering angle θH and the front wheel steering angle.

Figure 11:
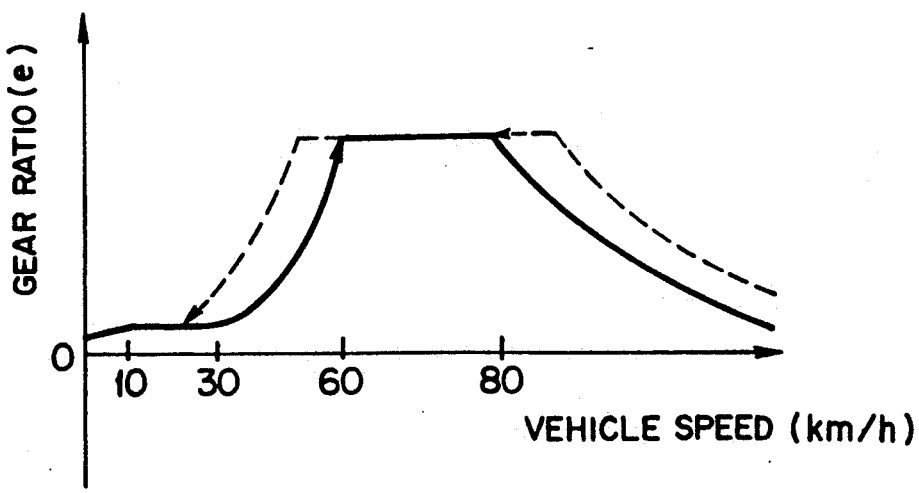
FIG. 11 shows the change in gear ratio e as a function of vehicle speed.

The operational control of the second motor 48 or variable control of the gear ratio in the steering rate variable control 41 is carried out depending on the vehicle speed. A specific example is indicated in FIG. 11. In this specific example, the gear ratio is fixed at a low level in the low vehicle speed range of 30 km/h or below. Over 30 km/h, the gear ratio e suddenly increases, and in the vicinity of 60 km/h it attains its maximum value. From 60 km/h to 80 km/h, in the medium speed region, the gear ratio is fixed at a maximum value, and in the high speed region exceeding 80 km/h, the gear ratio gradually decreases. According to the variable control of the gear ratio, as is indicated by the broken line in FIG. 11, a hysteresis is provided in the region moving toward the medium speed region, when the vehicle speed decreases, in order to keep the gear ratio e from suddenly decreasing, that is, to keep the gear ratio e from falling when there is a predetermined amount of deceleration. When the vehicle speed falls in the high speed region, a hysteresis is provided so that the gear ratio e increases quickly.

When either one of the first and second motors 37, 48 fails, control unit 15 controls the other, non-failing motor so that the amount that it is driven becomes zero. That is, when the first motor 37 fails, the amount the second motor 48 is driven, or the gear ratio of the variable gear change mechanism 41, is made zero. When the second motor 48 fails, the amount the first motor 37 is driven, or the amount that the relay rod 13 rotates, is made zero. In the above manner, whichever of the first and second motors 37, 48 fails, because a two wheel steering condition is attained in which the steering angle of the rear wheels 2L, 2R is made zero, stability can also be maintained.

When the steering angle of the rear wheels is made zero, because the amount that the non-failing motor 37 or 48 is driven decreases gradually from the value at the time the motor fails, the rear wheels 2L, 2R do not return suddenly when the relay rod returns to the center position as under the load of a centering spring.

When the rear wheels are steered by the movement of the relay rod 13 in the direction of the axle, because a large steering force is not required to counteract the preset load as in the prior art, the motors 37, 48 can be designed to be smaller with lower outputs, and the steering of the rear wheels can be made quicker.

Figure 6:
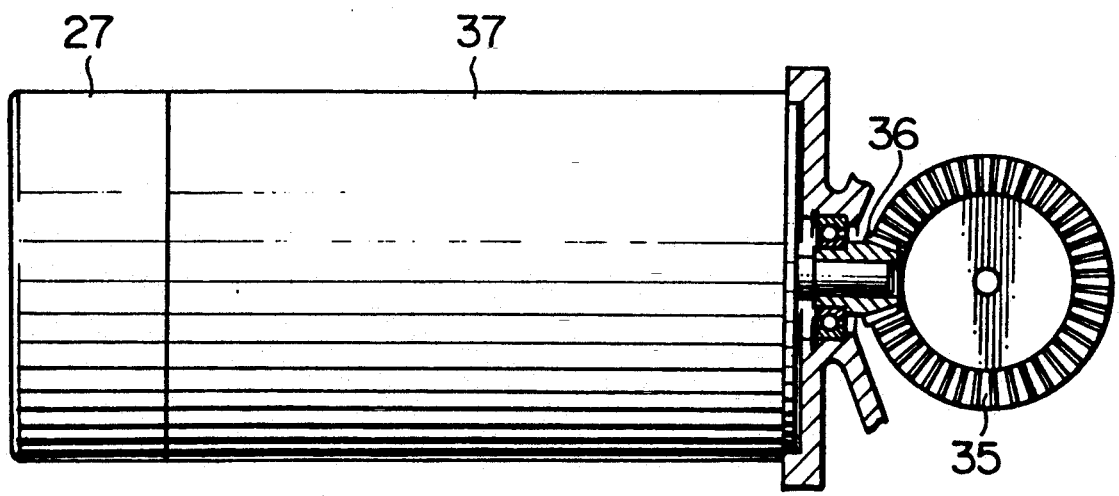
FIG. 6 is cross section taken along the plane VI—VI in FIG. 3.
Figure 7:
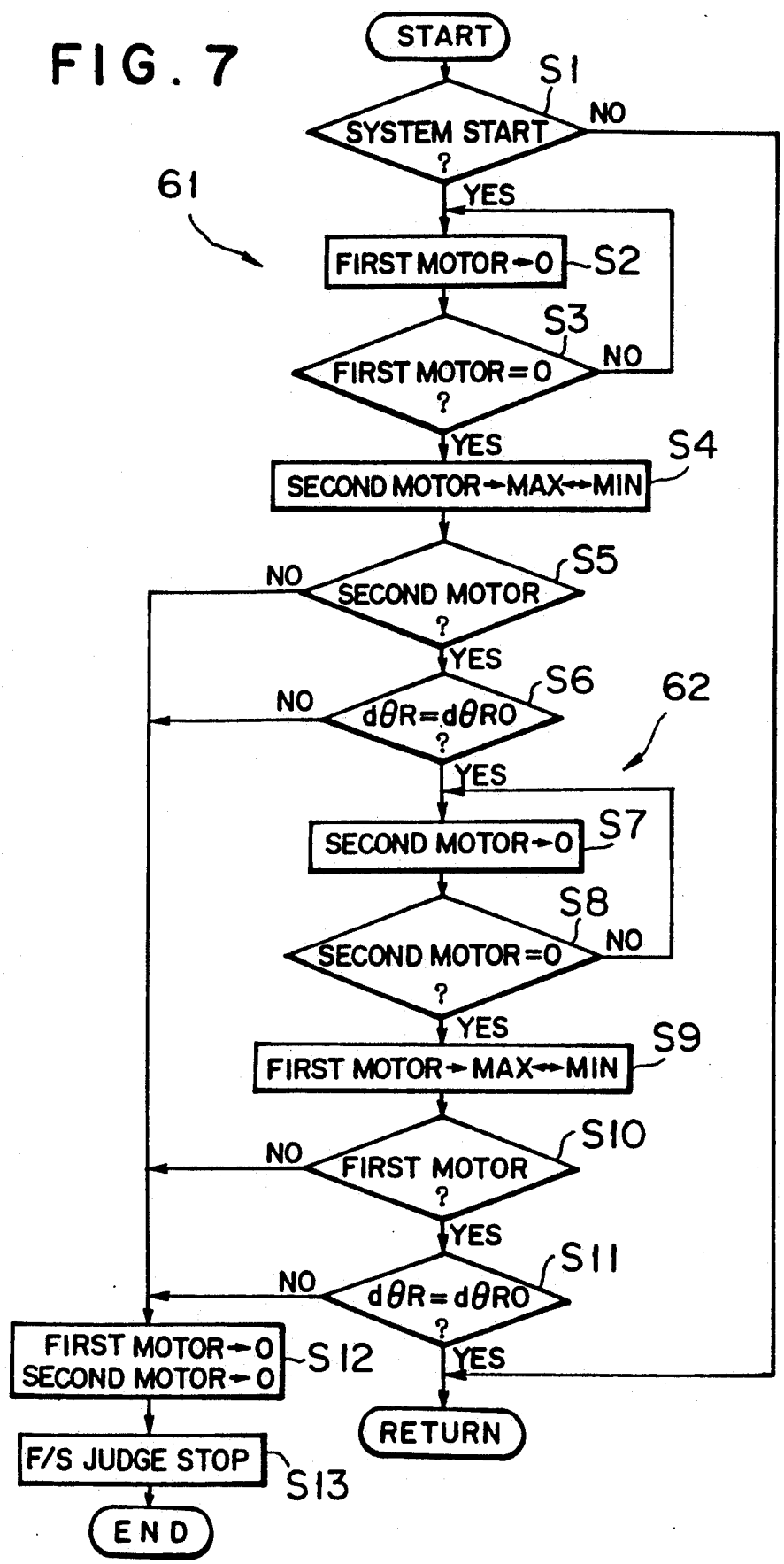
FIG. 7 is a flow chart representing a program used for determining the failure of a motor, etc., according to the present invention.

When either one of the first and second motors 37, 48 fails, the control command of the control unit 15 is to make the amount that both the motors are driven zero (step S7 as shown in FIG. 6), but because the failed motor does not operate even if receives the command, only the amount the non-failing motor is driven is made zero. Even if the encoder 27 and the gear ratio sensor 28 fail, just as when the motors 37, 48 fail, the amounts the motors 37, 48 are driven are made zero, a two wheel steering condition results and safety is maintained.

As is described above, according to the steering device for the rear wheels of a vehicle according to the present invention, a steering power is transmitted to the rear wheels corresponding to the product of the amount that the first motor 37 is driven and the amount that the second motor 48 is driven. When one of the motors fails, because the steering angle of the rear wheels is made zero by means of making the drive power of the other motor zero, one can maintain safety when one of the motors fails. The device, without centering spring and clutch, can be designed smaller and the rear wheel steering can be made quicker. Furthermore, no load is put on the motors or the engine, and the failure determination of the motor can be made quicker and more certain.

Moreover according to another embodiment, the failure of a sensor at the same time as the failure of a motor can be determined, which has great advantages for the control of the rear wheel steering.

Referring to FIG. 12, there is shown a flow chart of another embodiment for changing the gear ratio e.

In step S1, failure of the first and second motors 37, 48 is determined. If this judgment is Yes or there is failure, the gear ratio is made zero and the control is ended in step S2. If the judgment is No, it is determined whether flag F is "1" or not in step S3. If the judgment in step S3 is No, then it is determined whether an absolute value of the steering angle θH is greater than a predetermined value θHO in step S4. If the judgment is Yes, it is determined whether absolute value of the steering speed dθH is greater than a predetermined value dθHO is step S5. If judgment is No in step S4, it is judged whether brake switch is ON in step S6. In step S6, this judgment may be made by determining an acceleration or deceleration based on the vehicle speed. In step S5, if the judgment is Yes, the gear ratio is increased by 10% in step S7 and the control of the second motor 48 is prohibited in step S8. Thereafter, the flag is set at "1" in step S9. In step S5, if judgment is No, the control of the second motor 48 is prohibited in step S10.

If the judgment is Yes in step S3, or if the gear ratio has been increased in step S7, procedure is suspended until a predetermined time is passed in step S11. Thereafter, the flag is set at "0" in step S12. In step S13, the gear ratio is reset at a normal value. In step S11, the judgment whether the steering angle θH or the steering speed dθH is zero can be employed for this purpose. Thus, when both the steering angle θH and the steering speed dθH are great, or when the vehicle is under braking condition and the steering angle θH is small, the gear ratio is increased to enable the rear wheel to be promptly steered so that steering reliability can be improved.

While the present invention has been explained with reference to several preferred embodiments, one of ordinary skill in the art will recognize that modifications and improvements can be made while remaining within the scope and spirit of the invention. The scope of the invention is determined solely by the appended claims.

What is claimed is:

1. A steering device for rear wheels of a vehicle, comprising:
   a first motor operated in response to a steering angel of a steering wheel;
   a gear change mechanism for changing a gear ratio;
   a second motor for driving the gear change mechanism and controlling the gear ratio;
   a steering mechanism for steering the rear wheels by transmitting a portion of steering power, obtained by multiplying a drive force of the first motor by a drive force of the second motor, to the rear wheels;
   motor failure determination means which, when a rotational amount that an output shaft of one of the first and second motors is driven reaches zero, detects a failure in said one of the first and second motors and engages the other of the first and second motors; and
   control means for controlling both the first and second motors so that when the motor failure determination means detects a failure in said one of the first and second motors, a rotational amount that an output shaft of the other of the first and second motors is driven is set to zero.

2. A steering device according to claim 1, and further comprising:
   a rear wheel steering angle sensor for detecting a steering angel of the rear wheels of the vehicle; and
   means for detecting failure of said rear wheel steering angle sensor by monitoring the steering angle detected by the rear wheel steering angle sensor and, when the rotational amount that the one of the first and second motors is driven reaches zero, the other of the first and second motors is engaged and the steering angle of the rear wheels of the vehicle changes, a failure of the rear wheel steering angel sensor is detected.

3. A steering device according to claim 1, wherein the steering mechanism comprises a relay rod, axial movement of said relay rod providing a steering amount of the rear wheels as a sum of a rotational amount that the first motor is driven and a rotational amount that the second motor is driven.

4. A steering device according to claim 3, wherein the first motor is operated so that a rotational angle, $\theta 1$, of the relay rod is changed by operation of the first motor based on the following mathematical formula:

$$\theta 1 = -K1\ \theta H + K2\ V\ \Phi;$$

wherein $\theta H$ is the steering angle of the steering wheel, V is a vehicle speed, $\Phi$ is a yaw rate, and K1 and K2 are variables which change according to the vehicle speed and are determined according to characteristics of the vehicle.

5. A steering device according to claim 4, wherein K1 is about 0.35 until the vehicle speed reaches about 10 km/h, as the vehicle speed exceeds 10 km/h, gradually increases along with the vehicle speed until it becomes 1 around 40 km/h and, as the vehicle speed exceeds 80 km/h, decreases along with the vehicle speed.

6. A steering device according to claim 4, wherein K2 gradually increases when the vehicle speed is greater than 10 km/h and, when the vehicle speed is around 30 km/h, increases to about 0.005.

7. A steering device for rear wheels of a vehicle, comprising:
   a first motor operated in response to a steering angle of a steering wheel;
   a gear change mechanism for changing a gear ratio;
   a second motor for driving the gear change mechanism and controlling the gear ratio;
   a steering mechanism for steering the rear wheels by transmitting a portion of steering power, obtained by multiplying a drive force of the first motor by a drive force of the second motor, to the rear wheels;
   failure control means for controlling both the first and second motors so that when there is a failure in one of the first and second motors, a rotational amount that an output shaft of the other of the first and second motors is driven is set to zero; and
   second motor control means for controlling the second motor so as to increase the gear ratio in a middle vehicle speed range and decrease the gear ratio in a high vehicle speed range.

8. A steering device for rear wheels of a vehicle, comprising:
   a first motor operated in response to a steering angle of a steering wheel;
   a gear change mechanism for changing a gear ratio;
   a second motor for driving the gear change mechanism and controlling the gear ratio;
   a steering mechanism for steering the rear wheels by transmitting a portion of steering power, obtained by multiplying a drive force of the first motor by a drive force of the second motor, to the rear wheels;
   failure control means for controlling both the first and second motors so that when there is a failure in one of the first and second motors, a rotational amount that an output shaft of the other of the first and second motors is driven is set to zero; and
   second motor control means for controlling the second motor so as to increase the gear ratio in a middle vehicle speed range and decrease the gear ratio in low and high vehicle speed ranges.

9. In a steering device for rear wheels of a vehicle having a first motor operated in response to a steering angle of a steering wheel, a gear change mechanism, a second motor for driving the gear change mechanism and controlling gearing, a steering mechanism for steering the rear wheels by transmitting a portion of steering power obtained by multiplying a drive force of the first motor by a drive force of the second motor to the rear wheels, a rear wheel steering angle sensor for detecting a steering angle of the rear wheels of the vehicle, a rear wheel steering process comprising:
   a first step of determining whether the process has started, wherein if the determination is negative, the process is returned to start;
   if the first step is affirmative, a second step of setting a rotational amount that an output shaft of the first motor is driven to zero;
   after the second step, a third step of ascertaining whether the rotational amount the first motor is driven is zero, wherein if the third step is negative, the second step is repeated;
   if the third step is affirmative, a fourth step of changing a rotational amount that an output shaft of the second motor is driven between a first maximum value and a first minimum value in one cycle;

after the fourth step, a fifth step of determining whether the second motor has been operated;

if the fifth step is affirmative, a sixth step of determining whether said steering angle of the rear wheels is equal to an approximately zero value;

if the sixth step is affirmative, a seventh step of setting the rotational amount the second motor is driven to zero;

after the seventh step, an eighth step of determining whether the amount that the second motor is driven is zero, wherein if the eighth step is negative, the seventh step is repeated;

if the eighth step is affirmative, a ninth step of changing the rotational amount the first motor is driven between a second maximum value and a second minimum value in one cycle;

after the ninth step, a tenth step of determining whether the first motor has been operated;

if the tenth step is affirmative, an eleventh step of ascertaining whether the rear wheel steering angle is equal to an approximately zero value;

wherein if the eleventh step is affirmative, the process is returned to start;

wherein if any one of the fifth, sixth, tenth and eleventh steps is negative, a twelfth step of setting the rotational amount that the first and second motors are driven to zero; and after the twelfth step, a thirteenth step of making a failsafe determination and ending the process.

* * * * *